United States Patent

Lapaich

[15] 3,682,432
[45] Aug. 8, 1972

[54] RETRACTABLE LATCHING MECHANISM

[72] Inventor: Michael W. Lapaich, Rolling Prairie, Ind.

[73] Assignee: Clark Equipment Company

[22] Filed: Dec. 10, 1971

[21] Appl. No.: 96,711

[52] U.S. Cl. ............................ 248/361 R, 105/366 B
[51] Int. Cl. .......................................... B65d 45/00
[58] Field of Search ...248/361 R, 119 R; 105/366 A, 105/366 B, 366 C; 296/35 A

[56] References Cited

UNITED STATES PATENTS

| 3,521,845 | 7/1970 | Sweda et al. | 248/361 R X |
| 3,486,787 | 12/1969 | Campbell | 248/361 R X |
| 3,438,671 | 4/1969 | Seng | 248/361 R X |
| 3,331,333 | 7/1967 | Coulson | 248/361 X |

*Primary Examiner*—Chancellor E. Harris
*Attorney*—Kenneth C. Witt, John C. Wiessler, Robert H. Johnson and Lewis J. Llamm

[57] ABSTRACT

A retractable latch mechanism including a center body having a cavity therein, the center body being disposed within a frame structure to pivot between an operative position and a non-operative position. The mechanism also includes a pintle member which has a latch portion at one end thereof and is disposed through a bore in a guide member, the pintle and guide guide members being movable through an opening in the frame structure between a retracted position within the center body cavity and a raised position partially through the frame opening when the center body is in the operative position. When the pintle and guide members are in the raised position the center body may be pivoted to its non-operative position to lock the mechanism in the raised position and the pintle member may be pivoted between an unlatched position and a latched position.

9 Claims, 5 Drawing Figures

PATENTED AUG 8 1972 3,682,432

INVENTOR
MICHAEL W. LAPAICH
BY Kenneth C. Witt
ATTORNEY

RETRACTABLE LATCHING MECHANISM

BACKGROUND OF THE INVENTION

This invention is particularly adaptable for use in latching shipping containers to conveyances such as semi-trailer chassis which are adapted to be pulled over the highway or to railroad cars, but it is adaptable for other purposes as well. On vehicles which are constructed to handle shipping containers it is frequently desirable to have a latching mechanism which projects upwardly above the floor of the conveyance only during the time that it is being used to latch a container to the conveyance, and which may be retracted below the surface of such floor at other times so that the latching mechanism will not interfere with the placing of other types of cargo on the conveyance.

SUMMARY OF THE INVENTION

In carrying out my invention in one preferred form thereof, I provide a retractable latching mechanism which includes a frame support having an opening through one side thereof and a center body having a cavity therein, the center body being disposed within the frame and pivotal between an operative position and a non-operative position. A pintle member which has a latch portion at one end thereof is disposed through a bore in a guide member and the pintle and guide members are movable through the opening in the frame between a retracted position within the center body cavity and a raised position partially through the frame opening when the center body is in the operative position. When the pintle and guide members are in the raised position the center body may be pivoted to its non-operative position to lock the mechanism in the raised position and the pintle member may be pivoted between an unlatched position and a latched position.

DESCRIPTION OF PREFERRED EMBODIMENT

Figure 1:
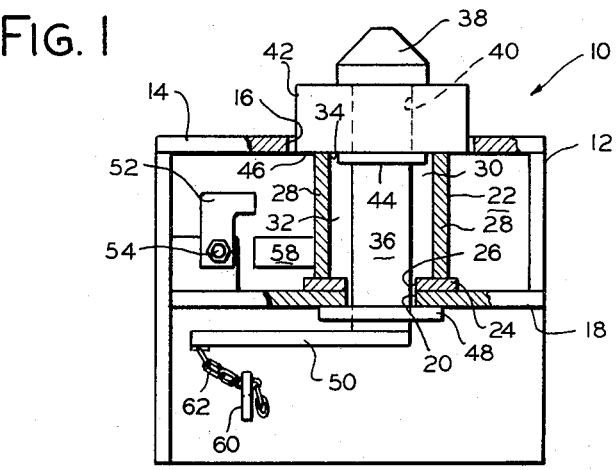
FIG. 1 shows a latching mechanism, partially in section, in accordance with this invention to illustrate the positioning of the mechanism components in the raised and latched position.

In the drawing the retractable latch mechanism of this invention is indicated generally by the numeral 10. As shown, mechanism 10 is mounted upon and partially within a bolster member indicated by the numeral 12, however it will be understood that the latch mechanism of this invention is not limited to use with such a bolster member and that the mechanism may be mounted on any suitable frame support or other structural member. Reference to "frame" hereinafter and in some of the claims is intended to cover any such suitable frame support.

Figure 2:
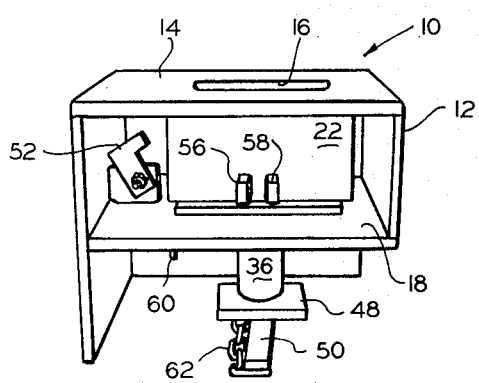
FIG. 2 is a perspective view showing the latching mechanism in its unlatched and retracted position.
Figure 3:
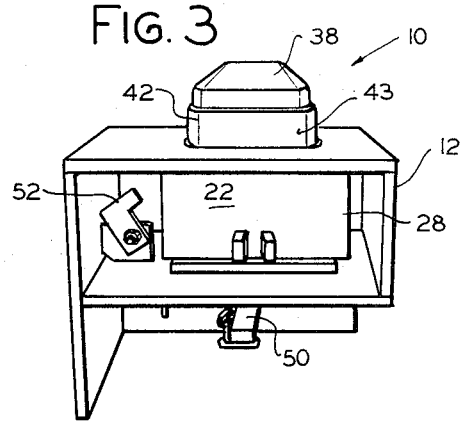
FIG. 3 shows the latching mechanism moved to the raised position.

The components of the latch mechanism are perhaps most readily apparent in FIG. 1 of the drawing which shows mechanism 10 in the raised and latched position adapted to secure a container (not shown) to the frame 12. The upper side 14 of frame 12 has an elongated opening 16 therethrough (FIG. 2) whose transverse dimension is selected to be greater than its longitudinal dimension and the frame lower side 18 has an opening 20 therethrough substantially in vertical alignment with upper side opening 16. Disposed between frame upper side 14 and lower side 18 is a center body 22 having means such as a handle (not shown) for pivoting the center body between a non-operative position as illustrated in FIG. 1 and an operative position as illustrated in FIG. 2. Center body 22 has a bottom plate 24 with an opening 26 therein similar to frame opening 20 and also has side walls 28 and end walls 30 (only one shown) connected to the bottom plate to form a rectangular "box like" structure with a cavity 32 therein. Center body side walls 28 are of a selected length greater than the length of end walls 30 and the center body is "open" at its top to provide a cavity aperture 34, which in this embodiment has the same length and width dimensions as cavity 32. A vertically disposed pintle member 36 passes loosely through lower wall opening 20, center body opening 26, and upper wall opening 16 and has a latch head portion 38 at the upper end thereof which may be formed integrally with the pintle member, but in any event is rigidly secured thereto. Pintle member 36 also passes loosely through a bore 40 disposed in a guide member 42 and a washer or other suitable means 44 is connected to the pintle so that the guide member is carried by the pintle adjacent latch head 38. The transverse and longitudinal dimensions of guide member 42 are selected to allow the guide member to reciprocate through upper wall opening 16 and are also selected relative to the dimensions of aperture 34 to allow the guide member and the pintle member to be moved through aperture 34 between the raised position shown in FIG. 3 and the retracted position shown in FIG. 2 when the center body is in its operative position, in which position the center body side walls 28 are substantially parallel to the transverse side 43 of the guide member (FIG. 3). It will now be recognized that when center body 22 is pivoted to the non-operative position shown in FIG. 1 the shape of aperture 34 relative to the shape of guide member 42 is such that the guide member lower surface 46 may abut the upper ends of the center body walls, thereby not allowing the guide member to move through aperture 34 and hence locking the mechanism in the raised position. A second washer or other suitable means 48 is carried by pintle member 36 near the lower end thereof and is adapted to abut the lower side 18 of frame 12 when the pintle is raised a distance sufficient to move guide member 42 above aperture 34 while still maintaining the lower portion of the guide member within the confines of opening 16. With a portion of guide member 42 remaining within opening 16 the walls of the opening may engage the sides of the guide member to limit its rotation when pintle 36 is pivoted within bore 40. A handle 50 is connected to the lower end of pintle member 36 to provide means for pivoting the pintle member about its vertical axis and also provide means for raising and lowering the pintle and the guide member when the latch mechanism components are properly positioned. A hook 52 is pivotally connected to frame 12 through a pin 54 and is adapted to be received between parallel plates 56 and 58 (FIG. 2) extending outwardly from center body 22 when it is desired to secure center body 22 in the non-operative position. A second hook 60 connected to frame 12 is adapted to engage a selected link of a chain 62 connected at one end thereof to handle 50 to provide means for securing pintle member 36 in the latched position.

Figure 4:
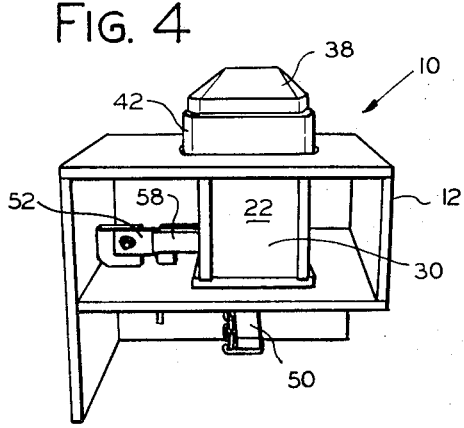
FIG. 4 shows a positioning of the mechanism components adapted to lock the mechanism in the raised position.
Figure 5:
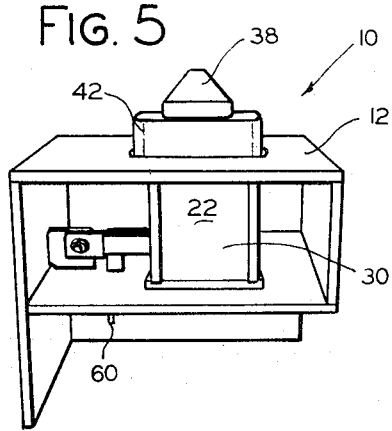
FIG. 5 shows the latching mechanism in the raised and latched position.

In order that one skilled in the art may more fully understand the form and function of my invention, I will now explain its operation. Referring specifically to FIG. 2, latch mechanism 10 is illustrated in the retracted position wherein center body 22 is in its operative position and guide member 42 and pintle member 36 are retracted below frame upper side 14 to a position within center body cavity 32. When it is desired to operate the latch mechanism to latch a container on to frame 12, the pintle member 36 and the guide member 42 carried thereby are moved upward through frame opening 16 to the raised position illustrated in FIG. 3, preferably by grasping handle 50 and lifting it vertically upward. In the raised position illustrated in FIG. 3 guide member 43 extends completely above aperture 34 so that center body 22 may now be pivoted about pintle member 36 through approximately 90° to the non-operative position illustrated in FIG. 4, thereby locking mechanism 10 in the raised position. When mechanism 10 is in such raised position, hook 52 may be received between projections 56 and 58 to secure center body 22 in the non-operative position and guide member 42 may guide and position a container (not shown) as it is lowered on to frame 12. Finally, handle 50 may be moved through an angle of approximately 90° horizontally to pivot the latch portion 38 to the latching position illustrated in FIG. 5 and an appropriate link of the chain 62 may be engaged by second hook 60 to secure the mechanism in the latched position. During such pivoting of the pintle member between the unlatched and latched position the guide member 42 will be restrained from horizontal rotation by engagement of its side surfaces with the walls of opening 16 and it will be understood that in the latched position illustrated in FIG. 5 the latch portion 38 may be utilized to secure a container to frame member 12. If further information is desired as to the manner in which such latching is accomplished reference may be had to U.S. Pat No. 2,963,310, particularly to FIGS. 8 through 11 of such patent, which illustrate the operation of a similar latch portion forming a part of a non-retractable latch mechanism.

It will be appreciated that the latch mechanism may be returned from the latched position to the unlatched position, and then to the retracted position, by following the reverse of the procedure heretofore described. To perform such reverse procedure it is necessary only to disengage chain 62 from hook 60 and move handle 50 to the unlatched position illustrated in FIG. 4; disengage hook 52 from projections 56 and 58 and pivot center body 22 to the operative position illustrated in FIG. 3; and finally move the pintle member and guide member to the retracted position illustrated in FIG. 2.

While I have described and illustrated herein a preferred embodiment of my invention in accordance with the statutes, it will be appreciated that modifications may be made. Therefore, it should be understood that I intend to cover by the appended claims all such modifications which fall within the true spirit and scope of my invention.

I claim:

1. A retractable latch mechanism comprising:
   a frame support having a first side and a first opening through said first side,
   a center body having a cavity therein, said center body disposed on one side of said first side and pivotal about an axis substantially perpendicular to said first side between an operative position and a non-operative position,
   a guide member having a bore therethrough, said guide member movable in said first opening between a retracted position within said cavity and a raised position partially through said first opening when said center body is in said operative position, and
   a pintle member disposed through said bore and having a latch portion at one end thereof, said pintle member being movable with said guide member between said retracted position and said raised position and also being pivotal within said bore between an unlatched position and a latched position when said guide member is in said raised position.

2. A retractable latch mechanism as specified in claim 1 wherein said centerbody has an aperture therein in communication with said cavity, said aperture having a shape selected relatively to the shape of said guide member to provide means for allowing said guide member to move through said aperture when said centerbody is in said operative position and for not allowing said guide member to move through said aperture when said centerbody is in said non-operative position.

3. A retractable latch mechanism as specified in claim 2 wherein a portion of said guide member remains within said first opening when said guide member is in said raised position and wherein the shape of said first opening is selected relative to the shape of said guide member to limit the rotation of said guide member relative to said frame when said pintle member is pivoted within said bore.

4. A retractable latch mechanism as specified in claim 3 and including means for maintaining said guide member adjacent said latch portion of said pintle member.

5. A retractable latch mechanism as specified in claim 4 wherein said frame support includes a second side apart from said first side, said center body being disposed between said first and second sides and said second side having a second opening therein, said pintle member passing through said second opening, said cavity, and said first opening when said pintle member is in said raised position.

6. A retractable latch mechanism as specified in claim 5 and including means for limiting the movement of said pintle member through said first opening as said pintle member is moved toward said raised position.

7. A retractable latch mechanism as specified in claim 6 wherein said means for limiting is a washer connected to said pintle member and adapted to abut said second side when said pintle member is in said raised position.

8. A retractable latch mechanism as specified in claim 7 and including means for moving said guide member and said pintle member between said retracted position and said raised position and for pivoting said pintle member between said unlatched position.

9. A retractable latch mechanism as specified in claim 8 and including means for securing said center body in said non-operative position and means for securing said pintle member in said latched position.

* * * * *